United States Patent
Sullivan et al.

(10) Patent No.: US 9,671,191 B1
(45) Date of Patent: Jun. 6, 2017

(54) METHODS AND SYSTEM FOR A STABILIZING CAMERA MOUNT FOR AN ARCHERY BOW

(71) Applicant: HIT-N-MISS OUTDOORS, LLC, Chester, IL (US)

(72) Inventors: Nicholas Sullivan, Chester, IL (US); Jeric Burns, Chester, IL (US)

(73) Assignee: Hit-N-Miss Outdoors, LLC, Chester, IL (US)

( * ) Notice: Subject to any disclaimer, the term of this patent is extended or adjusted under 35 U.S.C. 154(b) by 0 days.

(21) Appl. No.: 15/154,196

(22) Filed: May 13, 2016

(51) Int. Cl.
  *F41B 5/14* (2006.01)
  *G03B 17/56* (2006.01)
  *F41G 11/00* (2006.01)
  *F41G 1/467* (2006.01)

(52) U.S. Cl.
  CPC .......... *F41B 5/1492* (2013.01); *F41B 5/1426* (2013.01); *F41G 1/467* (2013.01); *F41G 11/002* (2013.01); *G03B 17/561* (2013.01)

(58) Field of Classification Search
  CPC ...... F41B 5/1492; F41B 5/1426; F41G 1/467; F41G 11/002
  USPC .......... 124/86, 88, 89; 33/265; 396/426, 429
  See application file for complete search history.

(56) References Cited

U.S. PATENT DOCUMENTS

| | | | |
|---|---|---|---|
| 4,296,725 A * | 10/1981 | Broderick | F41B 5/1492 124/23.1 |
| 4,643,159 A * | 2/1987 | Ryan | G03B 29/00 124/24.1 |
| 4,890,128 A * | 12/1989 | Kania | G03B 29/00 396/426 |
| 5,517,979 A * | 5/1996 | Closson | F41B 5/1426 124/86 |
| 6,286,796 B1 * | 9/2001 | Pugliesi | F41B 5/1492 124/88 |
| 6,425,697 B1 * | 7/2002 | Potts | F41A 33/00 352/243 |
| 6,526,956 B1 * | 3/2003 | Hankins | F41B 5/1492 124/86 |
| 6,678,988 B1 * | 1/2004 | Poff, Jr. | F41G 11/003 42/124 |
| 7,647,922 B2 * | 1/2010 | Holmberg | A01M 31/004 124/86 |
| 7,780,363 B1 * | 8/2010 | Holmberg | F41G 1/467 124/88 |
| 7,926,220 B2 * | 4/2011 | Holmberg | F16M 13/00 248/309.1 |
| 8,024,884 B2 * | 9/2011 | Holmberg | F41C 27/00 42/124 |
| 8,161,674 B2 * | 4/2012 | Holmberg | F41C 27/00 42/124 |
| 8,656,624 B2 * | 2/2014 | Holmberg | F41B 5/1492 42/124 |
| 8,839,776 B2 * | 9/2014 | Kingsbury | F41B 5/1426 124/1 |

(Continued)

*Primary Examiner* — Alexander Niconovich
(74) *Attorney, Agent, or Firm* — Polsinelli PC

(57) ABSTRACT

Embodiments of a stabilizing camera mount apparatus having a mount assembly for mounting a camera to a bow, such as an archery bow. The mount assembly includes a camera mount with a plurality of springs and/or a dampening material interposed between a top plate and a bottom plate for providing a dampening effect that prevents the camera from excessive movement when the bow is moved by an individual.

18 Claims, 5 Drawing Sheets

(56) References Cited

U.S. PATENT DOCUMENTS

| | | | | |
|---|---|---|---|---|
| 8,893,701 B1* | 11/2014 | Entrup | ............... | G03B 29/00 |
| | | | | 124/86 |
| 2007/0031142 A1* | 2/2007 | Moody | ................ | F41B 5/14 |
| | | | | 396/419 |
| 2010/0043765 A1* | 2/2010 | Lang | .................... | F41B 5/10 |
| | | | | 124/25.6 |
| 2010/0272428 A1* | 10/2010 | Piltz | .................. | G03B 17/00 |
| | | | | 396/428 |
| 2012/0151815 A1* | 6/2012 | Tate | ................. | F16M 11/041 |
| | | | | 42/90 |
| 2013/0288743 A1* | 10/2013 | Hunt | ................. | F41G 11/004 |
| | | | | 455/556.1 |
| 2013/0340738 A1* | 12/2013 | Mancini | ............ | F41B 5/1426 |
| | | | | 124/89 |

\* cited by examiner

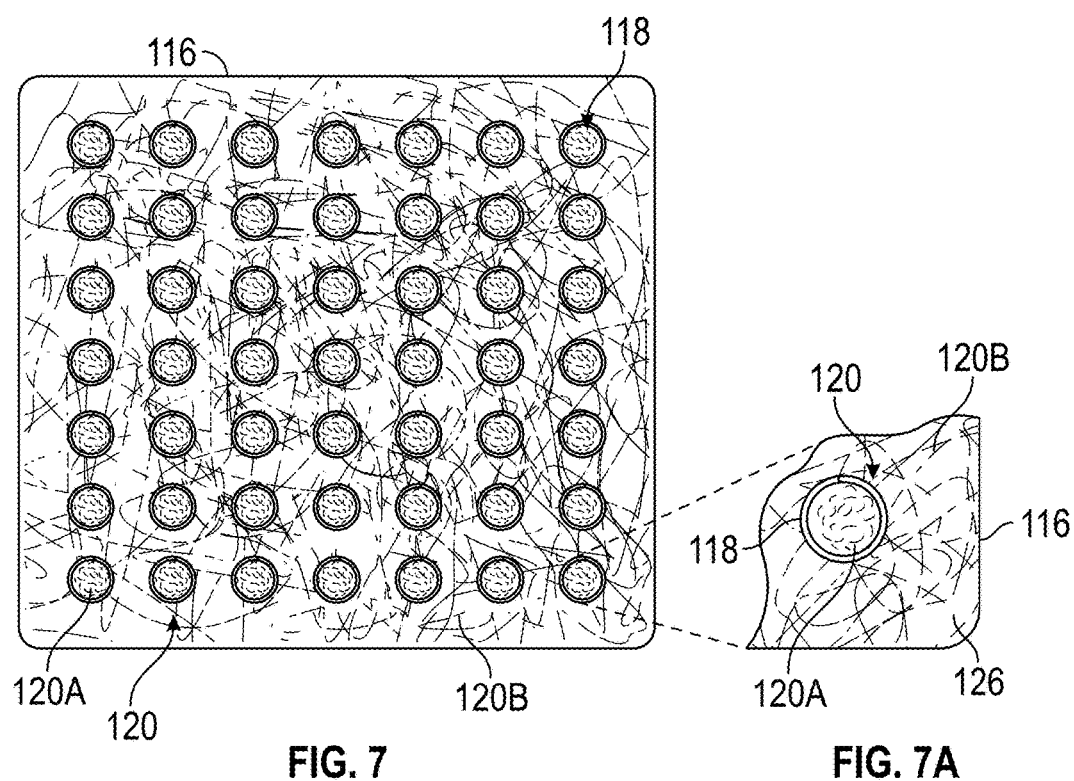

METHODS AND SYSTEM FOR A STABILIZING CAMERA MOUNT FOR AN ARCHERY BOW

FIELD

The present invention relates to a stabilizing camera mount, and in particular to systems and methods for a stabilizing camera mount used with an archery bow.

BACKGROUND

Hunting is a popular outdoor sport in which wildlife or feral animals are commonly hunted by humans for food, recreation, or trade. In recent years, it has become popular to video the process of the hunt using an archery bow as the weapon of choice. However, in situations where the hunter is alone it can be difficult to video the process of the hunt without assistance, especially when an archery bow is used due to the constant movement required to properly aim and then draw the bow prior to shooting an arrow. As such, the movement of the archery bow can cause a mounted video camera to constantly move, thereby resulting in video that is also constantly moving and unstable.

BRIEF DESCRIPTION OF THE DRAWINGS

FIG. 7 is a top plan view of a bottom plate and plurality of springs with a dampening material within and surrounding the springs for the stabilizing camera mount; and FIG. 7A is an enlarged view of the bottom plate of FIG. 7 showing one of the springs with the dampening material within and surrounding the spring for the stabilizing camera mount.

Corresponding reference characters indicate corresponding elements among the view of the drawings. The headings used in the figures do not limit the scope of the claims.

DETAILED DESCRIPTION

Figure 1:
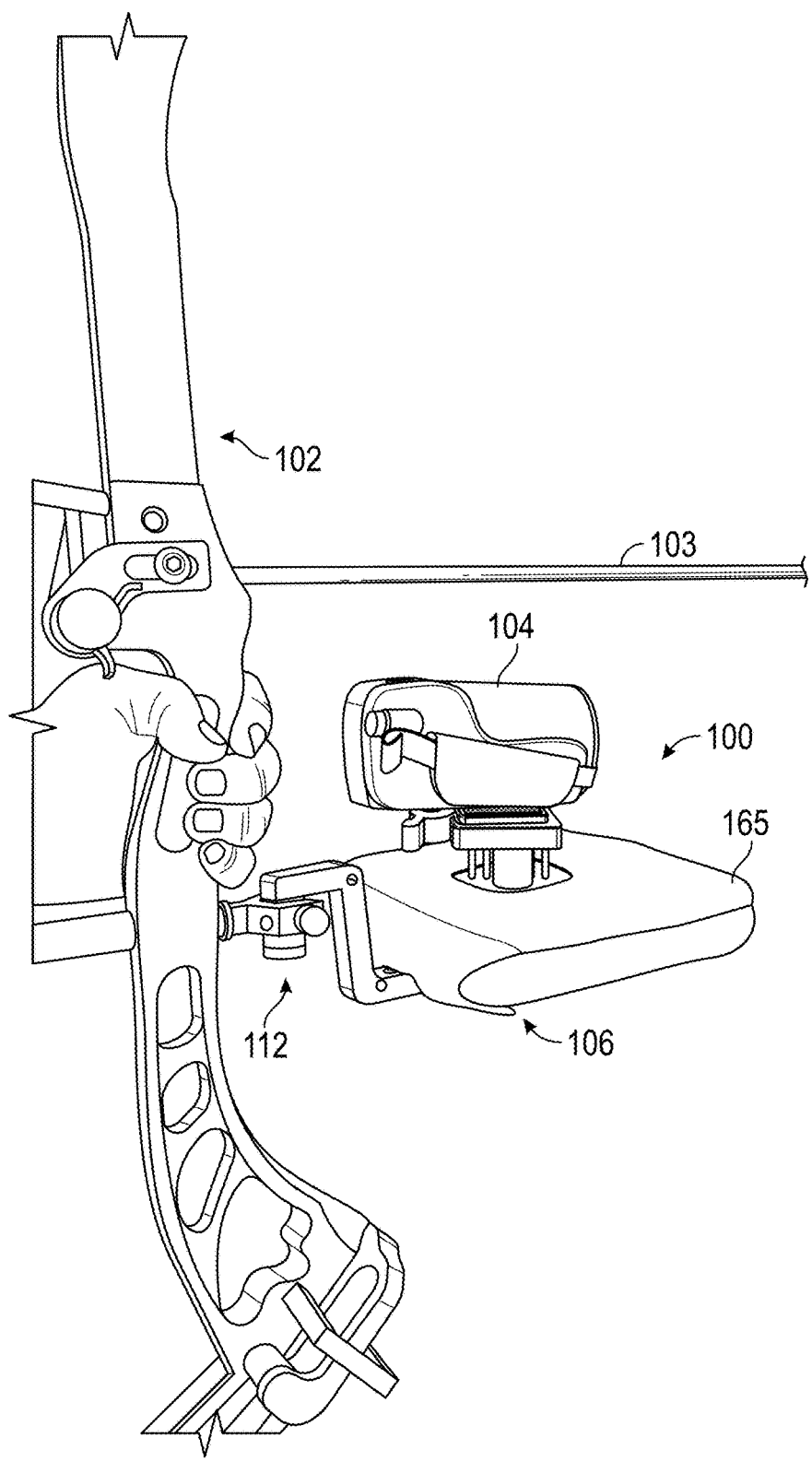
FIG. 1 is a perspective view of a stabilizing camera mount apparatus coupled to an archery bow.

A stabilizing camera mount apparatus adapted for use with a bow for providing a stabile platform that allows a camera mounted to the stabilized camera mount apparatus to provide a stable platform that allows for a relatively stationary video or picture to be taken by the camera from the perspective of the bow is disclosed. Referring to the drawings, embodiments of the stabilizing camera mount apparatus for use with an archery bow are illustrated and generally indicated as 100 in FIGS. 1-7.

Referring to FIG. 1, in some embodiments the stabilizing camera mount apparatus 100 is adapted to be engaged to an archery bow 102 in which a camera 104, such as a video camera, is mounted to the stabilizing camera mount apparatus 100 such that a clear and stabile video or picture is produced without any substantial shaking or movement of the camera 104 that may be caused by the movement of the archery bow 102 by an individual. As shown, the stabilizing camera mount apparatus 100 includes a mount assembly 106 that is configured to be engaged to the archery bow 102 in a manner that allows the camera 104 to be oriented substantially along the line of sight of the archery bow 102. For example, the camera 104 is mounted to the mount assembly 106 such that the target is visible to the camera 104 as the individual aims and releases the arrow 103 toward the target.

Figure 2:
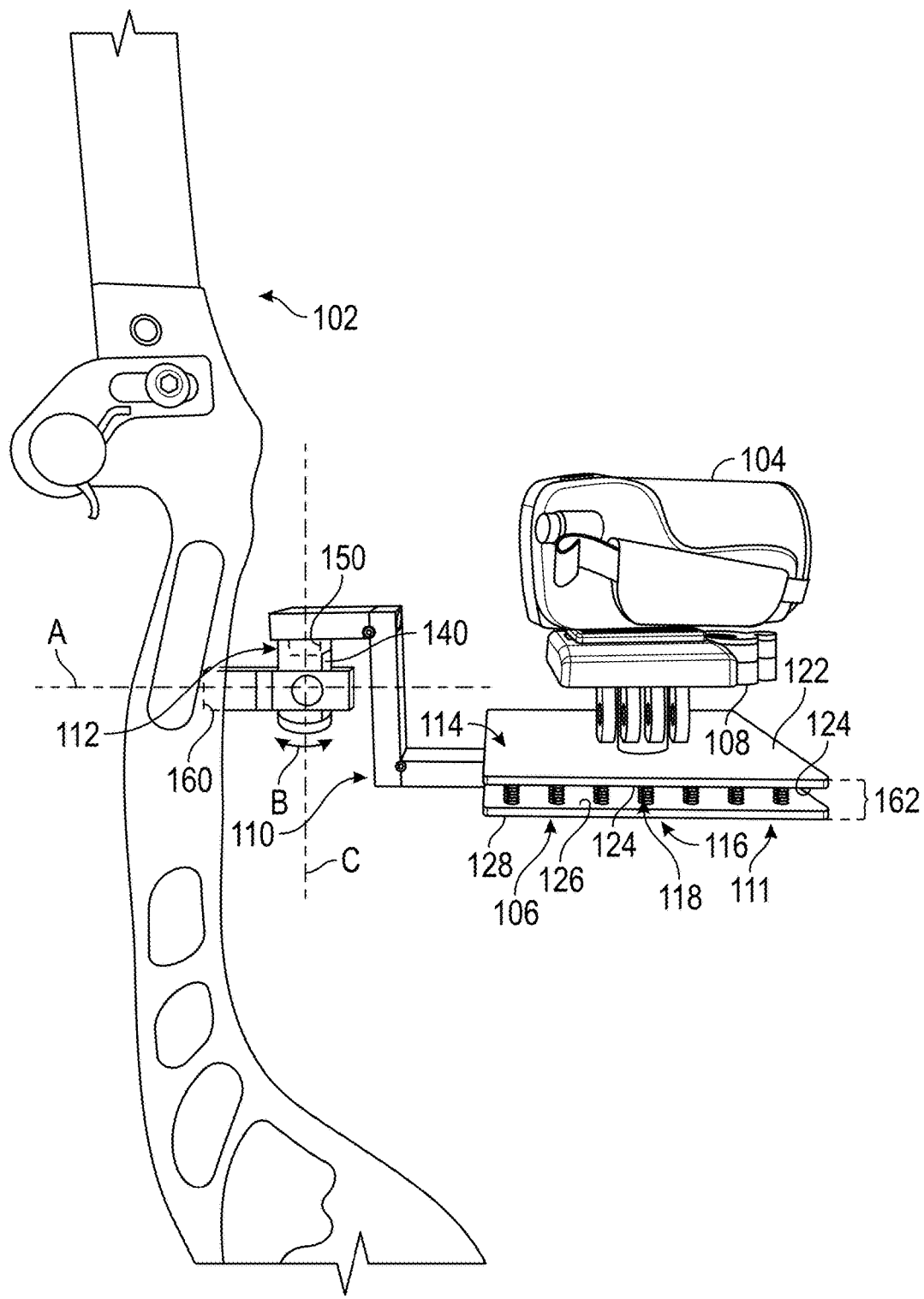
FIG. 2 is a side view of the stabilizing camera mount apparatus.

As shown in FIGS. 1 and 2, the mount assembly 106 includes a conventional tripod mount 108 that is operable to engage the camera 104 such that the camera 104 is oriented substantially along the line of sight of the arrow 103 defined by longitudinal axis A (FIG. 2) after the arrow 103 is nocked to the archery bow 102. The mount assembly 106 further includes a camera mount 111 that provides a stable base to the tripod mount 108 in response to any movement of the archery bow 102. A lateral extension 110 extends from the camera mount 111 and is coupled to a swivel mount 112 for securing the mount assembly 106 to the archery bow 102 as shall be discussed in greater detail below.

Figure 3:
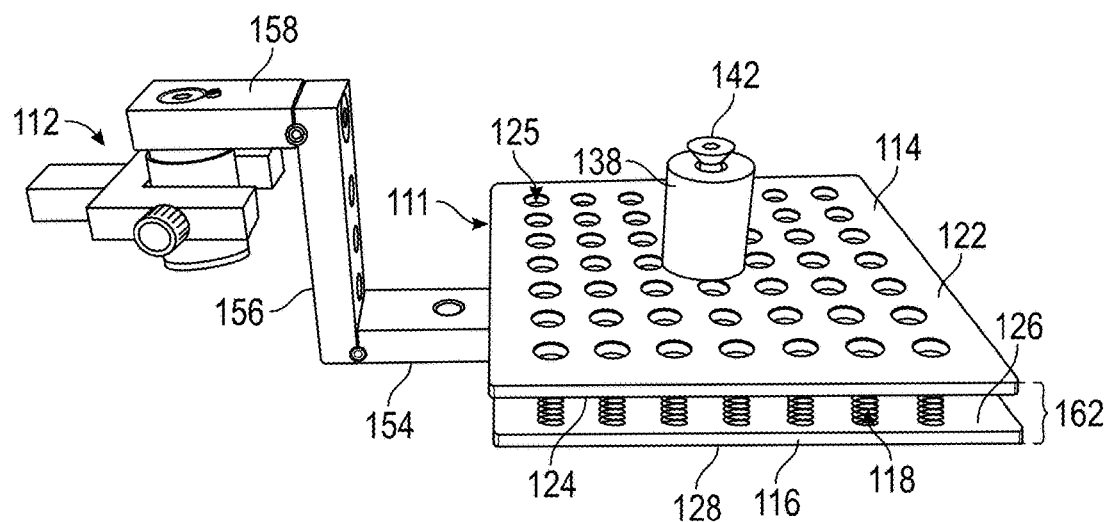
FIG. 3 is a side view of the stabilizing camera mount without the tripod mount.
Figure 4:
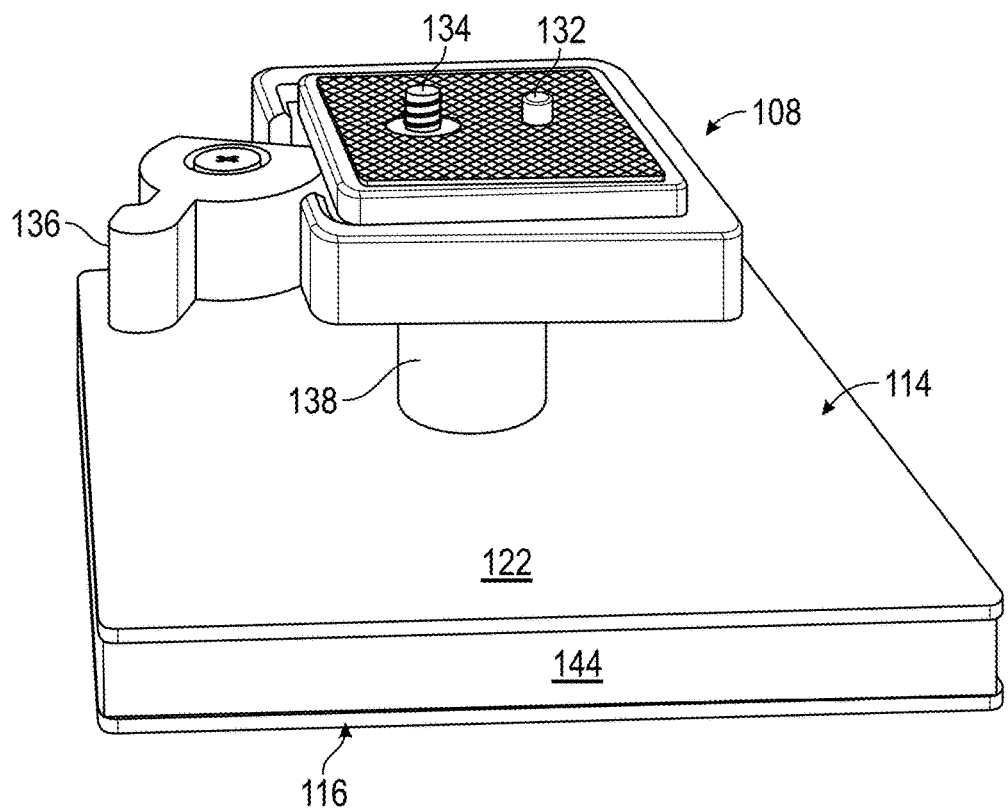
FIG. 4 is a perspective view of the tripod mount engaged to the camera mount.

In some embodiments, the tripod mount 108 is mounted to the camera mount 111 by a top plate 114 through a base 138 (FIGS. 3 and 4) that extends from an upper surface 122 of the top plate 114 and is secured to the tripod mount 108 using a securing member 142 (FIG. 3). As shown in FIG. 4, in some embodiments the tripod mount 108 includes an alignment pin 132 for properly orienting the camera 104 during the initial engagement to the tripod mount 108 and a securing member 134 in operative association with a handle 136, which is operable to secure the camera 104 to the tripod mount 108 through the securing member 134 when the handle 136 is actuated in one direction and releases the camera 104 from the securing member 134 when the handle 136 is actuated in an opposite direction.

Figures 5, 5A:
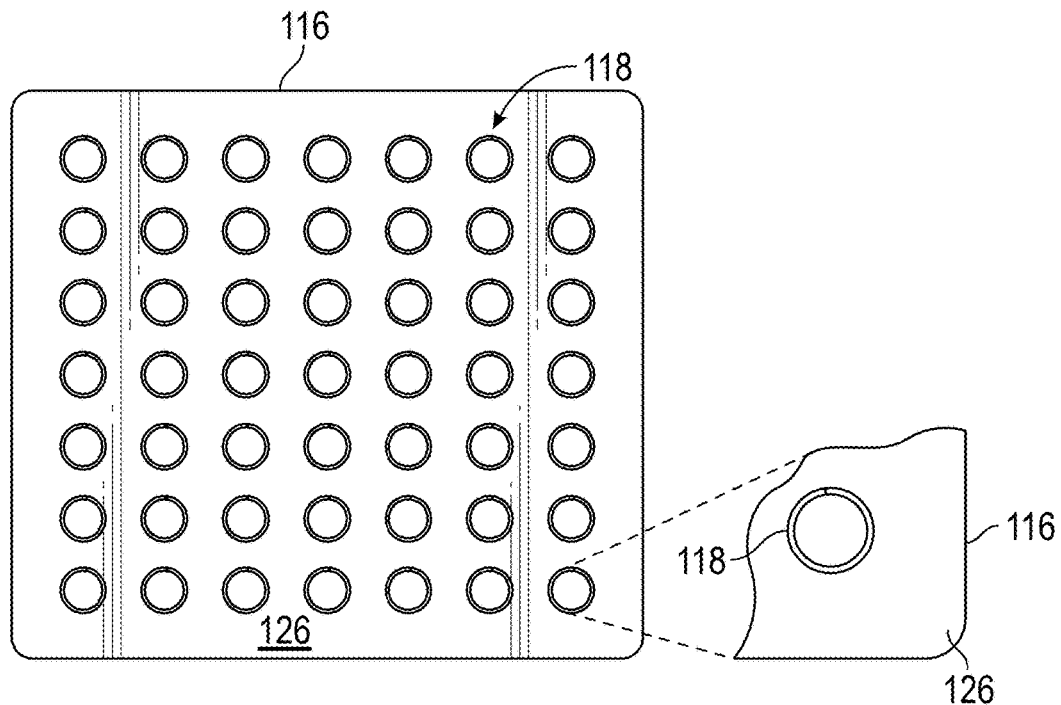
FIG. 5 is a top plan view of a bottom plate and plurality of springs for the stabilizing camera mount.
FIG. 5A is an enlarged view of the bottom plate of FIG. 5 showing one of the plurality of springs of the stabilizing camera mount.
Figures 6, 6A:
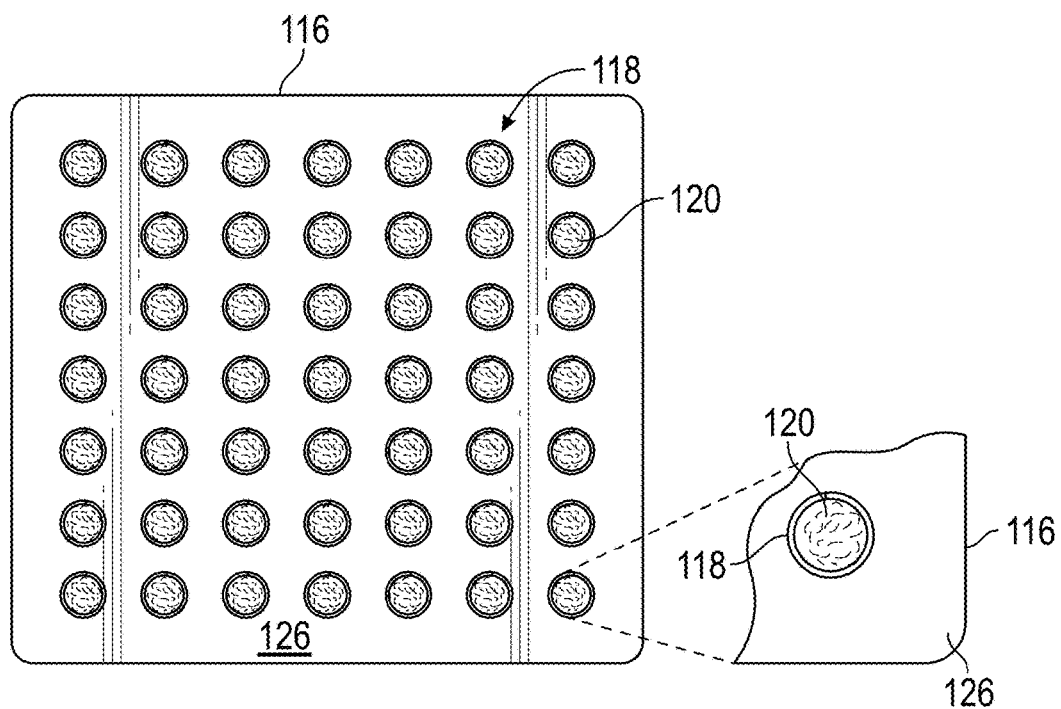
FIG. 6 is a top plan view of a bottom plate and plurality of springs with a dampening material for the stabilizing camera mount.
FIG. 6A is an enlarged view of the bottom plate of FIG. 6 showing one of the springs with the dampening material for the stabilizing camera mount.

Referring back to FIGS. 2 and 3, the top plate 114 of the camera mount 111 defines a lower surface 124 that is in operative engagement with an upper surface 126 of a bottom plate 116 for defining a space 162 between the top and bottom plates 114 and 116. In some embodiments as shown in FIGS. 5A and 5B, a plurality of springs 118 are in contact with and interposed between the lower surface 124 of the top plate 114 and the upper surface 126 of the bottom plate 116 such that the plurality of springs 118 produces a compensating movement that assists in stabilizing the camera 104 when movement of the archery bow 102 occurs. In some embodiments as shown in FIGS. 6A and 6B, each of the plurality of springs 118 may include a dampening material 120 disposed within the coils of each spring 118 for providing further dampening of any movement of the camera 104 by the plurality of springs 118 that occurs when the archery bow 102 is moved. For example, the dampening material 120 may be any type of material that dampens any movement of the archery bow 102, such as, but not limited to a cotton material, a synthetic resilient material, a plastic material, a fabric material, or any combination thereof. In some embodiments as shown in FIGS. 7A and 7B, the dampening material 120 may substantially fill the volume of the space 162 between the top and bottom plates 114 and 116 including dampening material 120A being disposed within each spring 118 and the same or other dampening material 120B being disposed filling the portion of the space 162 between each of the plurality of springs 118.

As shown in FIG. 1, a cover 165 may encase the camera mount 111. Referring to FIG. 4, in some embodiments the camera mount 111 may have side portions 144 that completely encase the space 162 between the top and bottom plates 114 and 116.

In some embodiments, the top plate 114 and/or bottom plate 116 may define a plurality of apertures 125 (FIG. 3) each configured to engage a respective spring 118. In the alternative, aligned recesses may be defined along the lower surface 124 of the top plate 114 and the upper surface 126 of the bottom plate 116 which are configured to receive either a bottom or upper portion of a respective spring 118 to secure each spring 118 between the top and bottom plates 114 and 116.

As shown in FIGS. 2 and 3, in some embodiments the extension 110 that secures the mount assembly 106 to the archery bow 102 may include a first extension member 154 having a horizontal orientation with one end connected to a lower surface 128 of the bottom plate 116 and an opposite end connected to one end of a second extension member 156 having a vertical orientation. In addition, the opposite end of the second extension member 156 is connected to one end of a third extension member 158 having a horizontal orientation. In some embodiments, the extension 110 may have other types of configurations to mount the stabilizing camera mount apparatus 100 to the archery bow 102, such as a straight configuration, an L-shaped configuration, a symmetrical configuration, a non-symmetrical configuration, and/or curved configuration.

As illustrated in FIGS. 2 and 3, the third extension member 158 is rotatably connected to the swivel mount 112 which is capable of a rotating action B that allows the camera 104 to swivel along axis C relative to the archery bow 102. The swivel mount 112 includes a swivel mount body 140 mounted to the archery bow 102 by a swivel member 148 engaged within a recess 150 of the swivel mount body 140. The swivel mount 112 may be rotated to align the mount assembly 106, and therefore the camera 104, along any particular orientation relative to the archery bow 102.

In some embodiments, the swivel mount body 140 forms a channel (not shown) configured to engage a screw member (not shown) for fixedly securing the swivel mount 112 to a recess 160 formed in the archery bow 102 to establish a secure connection between the archery bow 102 and the stabilizing camera mount apparatus 100. In other embodiments, the stabilizing camera mount 100 may be mounted or otherwise secured to the archery bow 102 using a binding arrangement, such as rope or string, or a mechanical securing arrangement, such as a metal collar or bolt. In some embodiments, the archery bow 102 may be a conventional archery bow or a cross bow.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A stabilizing camera mount apparatus for mounting to a bow, the stabilizing camera mount comprising:
    a mounting assembly secured to the bow, the mounting assembly configured to mount a camera, the mount assembly comprising:
        a camera mount having a top plate and a bottom plate with a space defined between the top and bottom plates;
        a plurality of springs interposed between the top and bottom plates within the space, wherein the plurality of springs provide a dampening effect in response to any movement of the bow, wherein the plurality of springs extend vertically between the top plate and the bottom plate; and
        an extension secured to the camera mount such that the camera mount is positioned in front of the bow; and
    a camera mounted to the mount assembly.

2. The stabilizing camera mount apparatus of claim 1, further comprising:
    a swiveling mount engaged to the extension and the bow for permitting rotation of the camera relative to the bow.

3. The stabilizing camera mount apparatus of claim 2, wherein the swivel mount comprises includes a swivel mount body defining an axial channel configured to rotatably engage a swivel member for allowing a swiveling action by the swivel mount body.

4. The stabilizing camera mount apparatus of claim 1, further comprising:
    a dampening material disposed within the space defined between the top and bottom plates for providing a dampening effect in response to any movement of the bow.

5. The stabilizing camera mount apparatus of claim 4, wherein the dampening material includes at least one of a cotton material, a fabric material, and a plastic material.

6. The stabilizing camera mount apparatus of claim 4, wherein the dampening material is enclosed within each of the plurality of springs.

7. The stabilizing camera mount apparatus of claim 4, wherein the dampening material substantially fills the entire space defined between the top and bottom plates.

8. The stabilizing camera mount apparatus of claim 1, further comprising:
    a tripod mount coupled to the camera and mounted to the camera mount, wherein the tripod mount comprises a handle that is operatively associated with a securing member for securing and releasing the camera relative to the tripod mount.

9. The stabilizing camera mount apparatus of claim 1, further comprising:
    a bow including a body, wherein the body is fixedly connected to the stabilizing camera mount such that the extension is oriented along a longitudinal axis that intersects the body of the bow at a substantially perpendicular angle.

10. The stabilizing camera mount apparatus of claim 1, wherein the extension comprises a first extension member oriented at a substantially horizontal orientation which is engaged to the camera mount, a second extension member oriented at a substantially vertical orientation and in communication with a third extension member orientated at a substantially horizontal orientation and rotatably engaged to a swivel mount.

11. The stabilizing camera mount apparatus of claim 1, wherein the bow comprises a compound archery bow or a cross bow.

12. A stabilizing camera mount apparatus for mounting to a bow, the stabilizing camera mount comprising:

a mounting assembly secured to the bow, the mounting assembly configured to mount a camera, the mount assembly comprising:
    a camera mount having a top plate and a bottom plate with a space defined between the top and bottom plates;
    a dampening material positioned between the top and bottom plates within the space, wherein the dampening material provides a dampening effect in response to any movement of the bow;
    a plurality of springs interposed between the top and bottom plates of the camera mount, with the dampening material disposed within each of the plurality of springs; and
    an extension secured to the camera mount such that the camera mount is positioned in front of the bow; and
a camera mounted to the mount assembly.

13. The stabilizing camera mount apparatus of claim 12, wherein the dampening material includes at least one of a cotton material, a fabric material, and a plastic material.

14. The stabilizing camera mount apparatus of claim 12, wherein the dampening material substantially fills the entire space defined between the top and bottom plates of the mount assembly.

15. The stabilizing camera mount apparatus of claim 12 further comprising:
    a swiveling mount engaged to the extension and the bow for permitting rotation of the camera relative to the bow.

16. The stabilizing camera mount apparatus of claim 15, wherein the swivel mount comprises includes a swivel mount body defining an axial channel configured to rotatably engage a swivel member for allowing a swiveling action by the swivel mount body.

17. The stabilizing camera mount apparatus of claim 12, further comprising:
    a tripod mount coupled to the camera and mounted to the camera mount, wherein the tripod mount comprises a handle that is operatively associated with a securing member for securing and releasing the camera relative to the tripod mount.

18. The stabilizing camera mount apparatus of claim 12, further comprising:
    a bow including a body, wherein the body is fixedly connected to the stabilizing camera mount such that the extension is oriented along a longitudinal axis that intersects the body of the bow at a substantially perpendicular angle.

\* \* \* \* \*